US010025853B2

(12) United States Patent
Miller

(10) Patent No.: US 10,025,853 B2
(45) Date of Patent: Jul. 17, 2018

(54) METHOD AND APPARATUS FOR FILTERING DATA BASED ON CONTENT SELECTED FOR FUTURE ACCESS

(71) Applicant: Verizon Patent and Licensing Inc., Basking Ridge, NJ (US)

(72) Inventor: Gregory J. Miller, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 173 days.

(21) Appl. No.: 14/042,118

(22) Filed: Sep. 30, 2013

(65) Prior Publication Data

US 2015/0095354 A1    Apr. 2, 2015

(51) Int. Cl.
*G06F 17/30* (2006.01)
*G06Q 10/10* (2012.01)
*G06N 99/00* (2010.01)
*G06N 5/04* (2006.01)

(52) U.S. Cl.
CPC .. *G06F 17/30699* (2013.01); *G06F 17/30864* (2013.01); *G06N 5/04* (2013.01); *G06N 99/005* (2013.01); *G06Q 10/10* (2013.01)

(58) Field of Classification Search
CPC ................................................ G06F 17/30699
See application file for complete search history.

(56) References Cited

U.S. PATENT DOCUMENTS

| 8,275,351 | B1 * | 9/2012 | Cazanas | H04L 51/02 455/466 |
| 8,706,685 | B1 * | 4/2014 | Smith | G06F 17/30882 707/608 |
| 8,725,751 | B1 * | 5/2014 | Lai | G06F 17/30247 382/190 |
| 2004/0154022 | A1 * | 8/2004 | Boss | G06Q 10/107 719/310 |
| 2011/0264804 | A1 * | 10/2011 | Vuksan | G06F 17/30699 709/225 |
| 2014/0280571 | A1 * | 9/2014 | Tarbox | G06Q 50/01 709/204 |
| 2014/0297260 | A1 * | 10/2014 | Allen | G06F 3/04842 704/9 |

* cited by examiner

*Primary Examiner* — Hung Le

(57) ABSTRACT

An approach is provided for filtering data accessed by user devices based on user selected content from a content selection device. The approach uses the commonly known knowledge of user selections of content (e.g. selection of media on a DVR) to aid in a user's attempts to limit exposure to spoilers of the content. This concept further involves removal of filters upon user viewing of content. As well as, creating of a content filter based on content information. The data filter is meant to prevent spoiling results or plot lines of media content selected by a user to watch at a later time or date.

21 Claims, 10 Drawing Sheets

700

800

METHOD AND APPARATUS FOR FILTERING DATA BASED ON CONTENT SELECTED FOR FUTURE ACCESS

BACKGROUND INFORMATION

Service providers are continually challenged to deliver value and convenience to consumers by, for example, providing compelling network services. One area of development has been related to media services that enable content recording (e.g., digital video recorders (DVRs)), on-demand selection, and the like that provide users with the ability to time-shift or otherwise select content for future access or viewing. However, because of the ability to time-shift, it is increasingly common that users are not accessing or viewing programming events or other content at the same time. This situation, coupled with the proliferation of real-time communications and ubiquitous access, in turn, creates the possibility that a user who has selected content for future access or viewing (e.g., by recording an event on a DVR, queuing on-demand content for future viewing, etc.) may have that future experience spoiled by seeing information (e.g., communications, web content, etc.) about the content before the user has viewed the content. Therefore, there is a need for filtering communication data received or accessed at a user device based on content that a user has selected for future viewing or access.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF EXAMPLE EMBODIMENTS

An apparatus, method, and system for filtering of user selected content information from data accessed by user devices, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the preferred embodiments of the invention.

Figure 1:
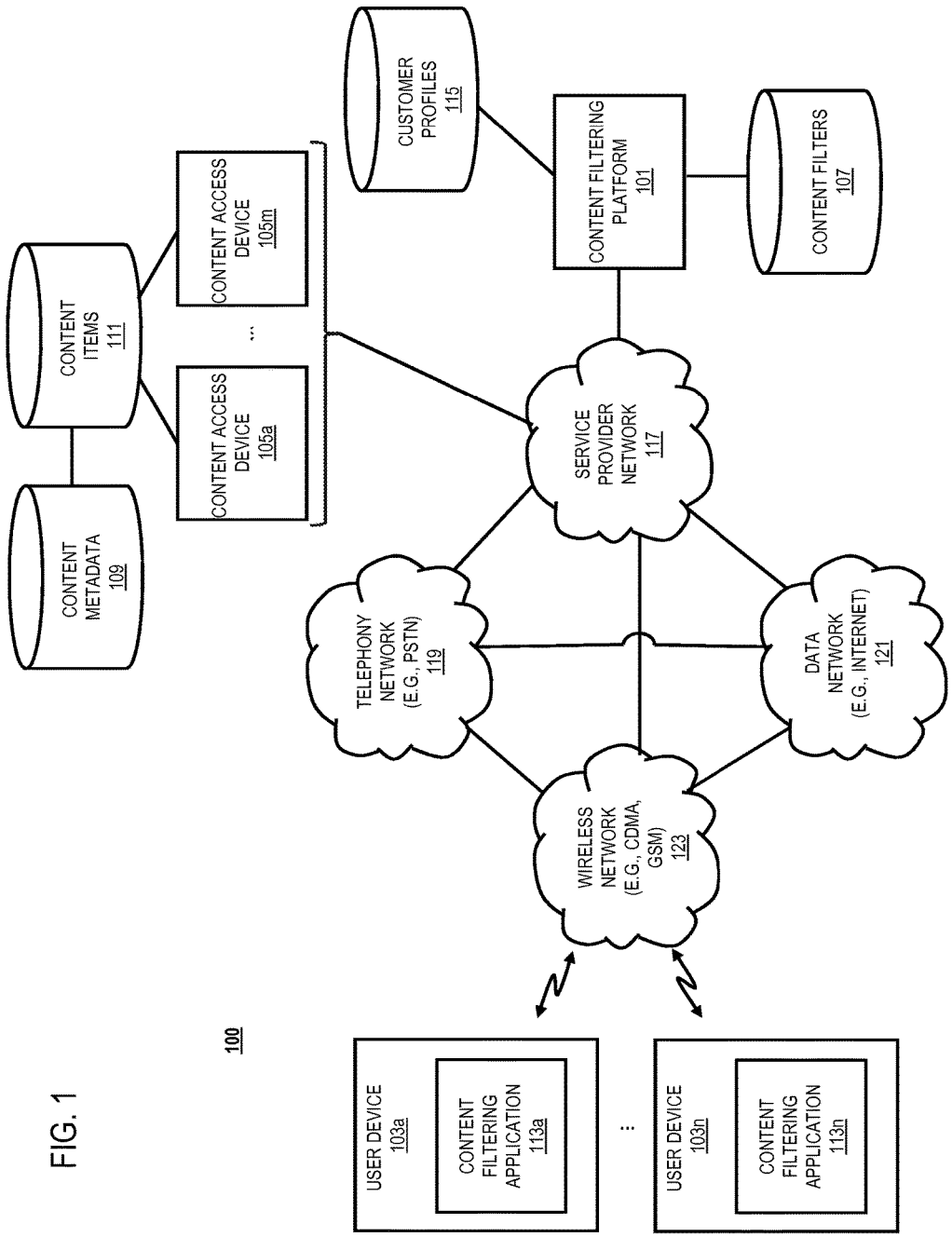
FIG. 1 is a diagram of a system capable of filtering data based on content selected for future access, according to one embodiment.

FIG. 1 is a diagram of a system capable of filtering of user selected content information from data accessed by user devices, according to an exemplary embodiment. As noted above, two popular capabilities that are enabled by modern technology can come into conflict: (1) the nearly instant communications abilities afforded by technologies such as text messaging, instant messaging, E-mail, micro-blogging feeds, etc.; and (2) the time-shifting abilities of digital video recorders (DVRs), media players, set-top boxes, etc. that enable users to view content (e.g., programming events, videos, etc.) at any time or place. For example, these two technologies can be at odds with each other when a user records a live event (e.g., a live sports or entertainment event) using a DVR with the intention of remaining in suspense regarding the outcome of the event until a future opportunity to view or otherwise access the event. Then, if the user were to receive a real-time communication or other data from someone else who is viewing the event live, that communication or data could inadvertently spoil the enjoyment of the event recorded or otherwise selected for future access.

Traditionally, to prevent this scenario, one approach would be for the user to inform others in advance that the user intends to record the event and watch it later. However, this traditional approach can greatly increase the burden associated with manually informing others as the number of content items and/or the number of contacts to inform increase. Another traditional approach is for the user to avoid communicating with others until the user has viewed or otherwise accessed the content recorded or selected for future access. However, in many cases, abstaining from communications can be impractical, and the user may miss important messages or data. Accordingly, there is need for an approach to resolving the conflict created by communications and other data that have the potential to spoil content that a user has selected for future access.

To address this need, as shown in FIG. 1, a system 100 of FIG. 1 introduces a capability for a content filtering platform 101 to preview incoming data (e.g., the content of real-time communications) at user devices 103a-103n (also collectively referred to as user devices 103) to identify messages that have the potential to spoil the outcome of content that the user has not yet viewed or accessed, but intends to watch later. In one embodiment, the system 100 determines the content selected for future viewing or access via the content access devices 105a-105m (also collectively referred to as content access devices 105). For example, the content selection may be indicated by selecting the content for recording on a DVR, for queuing on a media player, and the like.

In one embodiment, the processing and identification of the incoming data is performed by creating filters 107 based on content metadata 109 associated with the content item 111 selected for future access at the content access devices 105. The filters 107 are then, for instance, applied to data that is received or presented to the user device 103 to determine which of the data has the potential to be a spoiler. Although various embodiments discuss real-time communications (e.g., text messages, instant messages, E-mails, news feeds, etc.) as examples of the data to be filtered, it is contemplated that any data that is directed to or presented to the user at the user device 103 and/or the content access device 105 may be subject to filter application. For example, other examples of data include web or Internet data obtained from websites, ticker information presented on the content access device 105, other programs or events (e.g., news programs describing the events related to the selected content), etc.

In one embodiment, service providers may apply various embodiments of the filtering mechanism described herein to all content items 111 or to a subset of the content items 111. For example, service providers may tag content items 111 or programs for spoiler protection by applying a flag or other designation to mark the content items 111. In this way, when a user selects one of the flagged content items 111 for future access (e.g., by selecting the program for recording on the content access device 105), the system 100 will apply the content filtering mechanism. By way of example, in cases where a subset of content items 111 is selected for spoiler protection, service providers may tag events with high likelihood of spoilers such as live events (e.g., sporting events), television episodes, movie premieres, etc.

In one embodiment, the system 100 applies content filtering by installing content filtering applications 113a-113n (also collectively referred to as content filtering applications 113) at respective user devices 103 to perform all or a portion of the content filtering functions of the various embodiments described herein. In addition or alternatively, the content filtering platform 101 may perform all or a portion of the content filtering functions. It is also contemplated that any other component of the system 100 (e.g., the content access device 105, the user device 103, etc.) may perform all or a portion of the content filtering functions in addition to or in place of the filtering applications 113 and the content filtering platform 101. By way of example, the filtering functions include, but are not limited to, filtering the incoming data (e.g., the content of incoming real-time messages) to prevent the user from seeing data or messages that would spoil the outcome of content selected for future access (e.g., the outcome of live sporting events).

In one embodiment, the filter criteria for the content filters 107 may be configurable and set manually by the user. More specifically, the user can set or modify filter parameters based on the specific content in question (e.g., for content related to live sporting events, which teams were playing). By way of example, the user may manually configure or set the filter criteria on an ongoing basis for each content item. In other embodiments, the user may configure or set the filter criteria on a one time or periodic basis; and then, the system 100 can derive or otherwise determine filter criteria for other content items based on the initial configuration data.

In another embodiment, the system 100 (e.g., via the content filtering platform 101) enables the content filtering platform 101, the content access devices 105, the content filtering applications 113, and/or the user devices 103 to automatically establish the filtering parameters based on the content selected for future access (e.g., the programs that the user has scheduled to record). Since, in most cases, the content access device 105 (e.g., a DVR) has information on what programs the user has scheduled to record, when they programs are scheduled to air live, whether or not the user has viewed them yet, and metadata describing the programs, the content access device 105 and/or the content filtering platform 101 (e.g., in communication with the content access device 105) has sufficient information to make inferences using, for instance, simple logic about whether the user is recording an event that is susceptible to spoilers (e.g., a live event) and might not want to know about the outcome of the event in real time. Using that information, the content filtering platform 101, for instance, dynamically notifies the user devices 103 to filter incoming data (e.g., messages such as SMS, E-mail, voice-to-text, other real-time messages, etc.) during a specified time window related to a specified topic.

In one embodiment, the filtering is performed at the user devices 103 by the content filtering applications 113. In one embodiment, the content filtering applications 113 use a natural language interface and are capable of processing incoming data (e.g., messages, web data, etc.) in real time to determine whether data should be filtered to avoid potential spoilers. For example, the content filtering applications 113 can recognize (e.g., via natural language processing) topics in the data that can potentially spoil the outcome of content items that the user has selected for future access or viewing. In one embodiment, the applied content filters 107 are capable of recognizing abbreviations, nicknames, and other shorthand typically used in messaging or other communications. In one embodiment, the content filters 107 also can be tailored to environments where sharing comments and/or reactions about live events is common, such as sports or other types off televised competitions or contests.

In one embodiment, when the filter 107 detects incoming data (e.g., message content data) that matches its criteria, the system 100 can notify the originator of the data (e.g., a sender of a message), the recipient of the data (e.g., the user), or both. For example, when notifying the recipient, the content filtering platform 107 can specify who the sender is and what filter criteria were triggered. When notifying the originator of the data (e.g., the sender), the content filtering platform 101 indicates to the sender that the intended recipient has decided to filter incoming data related to content that the user has selected for future access or viewing, and is currently not viewing or accessing the content referenced in the data or incoming message.

In one embodiment, the content filtering platform establishes a relationship between a user account on the content access device 105 (e.g., a DVR) and one or more identifiers (e.g., one or more E-mail addresses, one or more phone numbers, etc.) belonging to a user. In this way, multiple user accounts can co-exist on a content access device 105 and/or user device 103 for content filtering. In addition, the same user account can exist on multiple content access devices 105 and/or user devices 103. In one embodiment, the content filtering platform 101 maintains filters 107 and associated filter criteria on a per-user basis, thus when a content item is scheduled for future access, the action can be associated with a particular user even when there are multiple users on the same device and/or multiple devices for the same user. In one embodiment, the user account information and per-user filters 107 are stored in, for instance, a customer profiles database 115.

In one embodiment, at any given time, the content filtering platform 101 can display active filters 107 at the content access device 105 and/or the user device 103. The content filtering platform 101 also can enable modification, deletion, activation, deactivation, and/or other management functions from an interface on the content access device 105 and/or on the user device 103. In one embodiment, the content filtering platform 101 can automatically delete a content filter 107 when the corresponding content item 111 (e.g., a program) is deleted from the content access device 105.

In one embodiment, the content filtering platform 101 interacts with the content access devices 105, the user devices 103, and other components of the system 100 through a service provider network 117. The service provider network 117, in turn, can interact with one or more other networks, such as a telephony network 119, a data network 121, and/or a wireless network 123. Although depicted as separate entities, networks 117-121 may be completely or partially contained within one another, or may embody one or more of the aforementioned infrastructures. For instance, the service provider network 117 may embody circuit-switched and/or packet-switched networks that include facilities to provide for transport of circuit-switched and/or packet-based communications. It is further contemplated that networks 117-123 may include components and facilities to provide for signaling and/or bearer communications between the various components or facilities of system 100. In this manner, networks 117-123 may embody or include portions of a signaling system 7 (SS7) network, or other suitable infrastructure to support control and signaling functions.

In exemplary embodiments, any number of customers may access the content filtering platform 101 through any mixture of tiered public and/or private communication networks. According to certain embodiments, these public and/or private communication networks can include a data network, a telephony network, and/or wireless network. For example, the telephony network may include a circuit-switched network, such as the public switched telephone network (PSTN), an integrated services digital network (ISDN), a private branch exchange (PBX), or other like network. The wireless network may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Additionally, the data network may be any local area network (LAN), metropolitan area network (MAN), wide area network (WAN), the Internet, or any other suitable packet-switched network, such as a commercially owned, proprietary packet-switched network, such as a proprietary cable or fiber-optic network.

In one embodiment, the content filtering platform 101 may be a platform with multiple interconnected components. The content filtering platform 101 may include multiple servers, intelligent networking devices, computing devices, components and corresponding software for filtering of user selected content information from user devices. The content filtering platform 101 may include rules on processing content items 111 selected for future access to determine what content filters 107 to apply. In one embodiment, filters 107 may be applied to user devices 103 through installation of content filtering applications 113 at the user devices 103.

In one embodiment, a content filtering platform 101 may add or remove filters 107 based on user request. In one embodiment, the content filtering platform 101 may receive a request from a user to validate and initiate a filter 107 based on content items 111 selected for future access. By way of example, the content filtering platform 101 may match the user against customer profiles 115 in order to validate the user request. In one embodiment, validating a request may be further based on matching one or more parameters in the request against the context of a user, user device 103, content access device 105, or combination thereof associated with the user's account as specified in, for instance, the customer profiles 115. In one embodiment, the request to initiate filtering of incoming data may be based on a request to record a content item 111, a request to buy the content item 111, a request to rent the content item 111, a request to stream the content item, and the like.

In one embodiment, the content filtering platform 101 may create filters 107 that are applied to data accessed by the user devices 103 and/or the content access devices 105. By way of example, the data that may be filtered at the user devices 103 may include one or more communication messages (e.g. voicemails, text, SMS, email, voice-to-text, or other real-time messages in text format), one or more information feeds (e.g. news feeds, ticker blocks, blog feeds, forum feeds), Internet content or a combination thereof. The data that may be filtered at the content access devices 105 include, for instance, other content items or events viewed or scheduled for recording and/or another other data that is presented to the user (e.g., information tickers, bulletins, messages, etc.). For example, other programs selected by the user for viewing at the content access devices 105 can be filtered if they have the potential to spoil another content item that has been selected for future access.

In one embodiment, the form of filtering is dependent on the data that is to be filtered. For example, Internet content, video, images, etc. that are to be filtered may be blacked out or blurred so that the user cannot read the relevant information, while messages may be filtered by redacting content or by preventing the message from being displayed to the user. It is contemplated that the system 100 may use any form of filtering applicable to a given data type.

In one embodiment, as previously discussed, the content filtering platform 101 may notify the originator of filtered data with a message stating a content filter 107 has been applied and that the intended recipient may not view or access the data for a certain period of time. In one embodiment, the content filtering platform 101 may notify the user that a content filter 107 has been created for the content item 111 selected by the user. In one embodiment, the content filtering platform 101 may remove a filter 107 after a user has viewed or accessed the corresponding content item 111 either partially or fully from the content access device 105. In addition, the content filtering platform 101 can generate a message indicating the removal of the content filter 107.

In one embodiment, the content filtering platform 101 may present a user interface displaying a listing of the content items 111 selected for future access and the content filters 107 that have been activated. In one embodiment, the user interface may be presented at a user device 103, content access device 105, and/or any other component of the system 100 capable of presenting the user interface.

In one embodiment, the content access device 105 is a DVR. The user selects to record a program (e.g. TV show, movie, sports event, etc.) on the DVR which upon selection is processed into a filter 107 by the content filtering platform 101 using the content metadata 109. In one embodiment, the content filtering platform 101 processes the content item 111 itself, searching for key words or phrases using a natural language process to create filters 107. In one embodiment, the content filtering platform 101 processes the metadata for the content item using the showing time, new or old showing, pre-recorded or live status, program type (e.g. drama TV show/movie, action TV/show movie, etc.), program participants (e.g. for a sporting event the competing parties), etc. to create filters 107. In one embodiment, the content filtering platform 101 processes the past related or similar programs selected and past filters 107 to create filters 107. In yet another embodiment, the predefined filters 107 may be pre-created for the content items 111. In this way, when the content item 111 is selected for future access, the content filtering platform 101 can retrieve the predefined filter 107 and apply it without having to create a new filter.

In one embodiment, the content access device 105 is a streaming media device or application. For example, the user may select to be notified of release of a new movie, or select a specific director or actor's movies as preferential. The created filters 107 may then be based on the director's names, actor's names, movie types, movie release dates, etc. and created according the to process described above.

In one embodiment, the user device 103 (e.g. smart phone) may attempt to access a website containing information related to the content item 111. In this case, the website data can be processed against filters established for the content item 111. For example, if the content item 111 selected for future access is a recording of a live tennis match, the content filtering platform 101 can parse the incoming web data for requested websites to determine whether any of the incoming data matches filter criteria (e.g., for a tennis match, filter criteria may include player names, tennis tournament names, match times, scores, etc.). This filtering may result in a blacked out or blurred related section of the website. Where the user device 103 receives communications from other devices through text or E-mail, the text messages and E-mails are filtered using the same filter criteria. In one embodiment, the communications (e.g., E-mails or text messages) may be separated from the normal inbox and put in a filtered box for future viewing.

Figure 2:
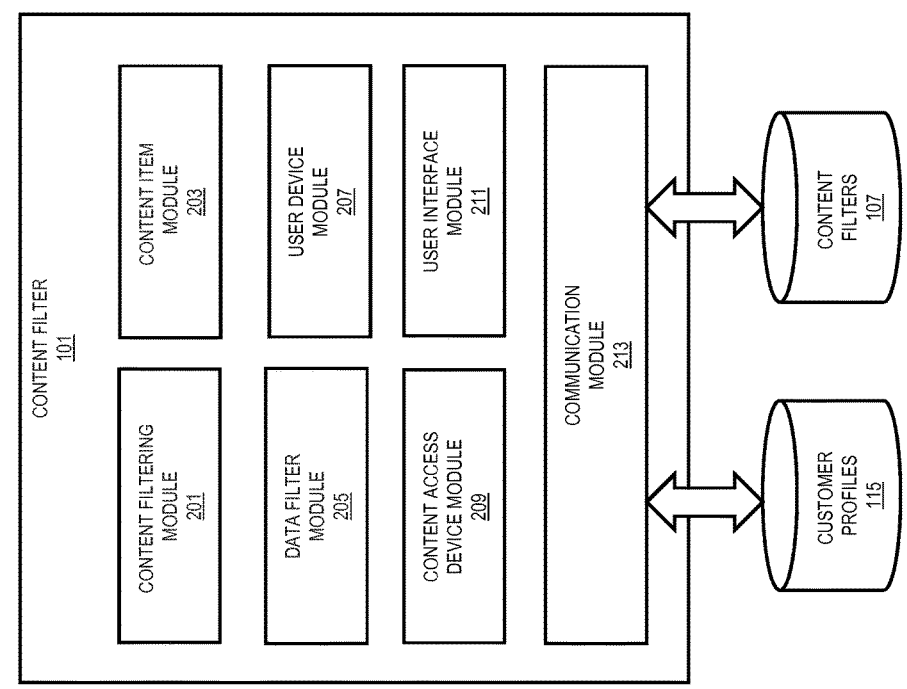
FIG. 2 is a diagram of the components of the content filtering platform, according to one embodiment.

FIG. 2 is a diagram depicting the components of the content filtering platform 101, according to one embodiment. The content filtering platform 101 includes various executable modules for performing one or more computing, data processing and network based instructions that in combination provide a means for filtering user selected content data from access by user devices. Such modules can be implemented in hardware, firmware, software or a combination thereof. Although the content filtering platform 101 is depicted as a standalone component, it is contemplated that the content filtering platform 101 and/or its functions may be implemented in other components of the system 100 including the content access devices 105, the content filtering applications 113, and the user devices 103.

By way of example, the content filtering platform 101 may include a content filtering module 201, a content item module 203, a data filter module 205, a user device module 207, a content access device module 209, a user interface module 211, and a communication module 213. These modules 201-213 can interact with customer profiles 115, content metadata 109, content items 111, etc. in support of their functions. According to some embodiments, the customer profiles 115, content metadata 109, and content items 111 are maintained and updated based, at least in part, on one or more transactions conducted with user devices 103 and/or content access devices 105.

In one embodiment, the content filtering module 201 determines filters for filtering of user selected content information from user devices. The filters may be associated with filtering data accessed by the user devices. The content filtering module 201 may also configure, remove or edit filters of one or more content items. In one embodiment, the content filtering module 201 may be used with the content item module 203, data filter module 205, user device module 207, content access device module 209, user interface module 211, and communication module 213 in varying forms. In one embodiment, the content filtering module 201 may be used to maintain a database of user devices 103, content access devices 105, etc. associated to a user. In one embodiment, the content filtering module 201 may be used to maintain customer profiles 115, content filters 107, and/or content metadata 109. In one embodiment, the content filtering module 201 may transfer information between the other modules. By way of example, between the content item module 203 and data filter module 205 when the data filter module 205 needs to process information retained by the content item module 203.

In one embodiment, the content item module 203 identifies the content item 111. For example, the content item 111 may be identified by user selection of the content item 111 for future access. The content item 111 may also be identified by requests to record, requests to buy, requests to rent, requests to stream, or a combination thereof of the content item. The content item module 203 also processes the content item 111 by selection through content access devices 105 which may include set top boxes, DVR, personal computer (PC), tablets, or other devices configured to access content items. In one embodiment, the content item module 203 also pulls content item information from the content metadata 109 for use in processing to create filters 107. For example, the content item 111 may include movies, music, sporting events, television shows, other media, or a combination thereof. In one embodiment, the content metadata 109 may include the content itself, the time, showing (e.g. first or later), viewing time, date, content, context, metadata, user, series, related content items, related terms, key parts of a content item, previous similar content item viewing data, or combination thereof of the content item.

The data filter module 205 processes the content item 111. In one embodiment, the content item processing may be of the content item 111 itself, of metadata 109 related to the content item (time, showing (e.g. first or later), viewing time, date, content, context, metadata, user, series, related content items, related terms, or combination thereof), or combination thereof. In one embodiment, the data filter module 205 processing of the content item 111 creates a filter 107 and associated filter criteria. The filter criteria may be based on the metadata 109 of the content item 111, natural language processing of the content item 111 or metadata 109, context information of the user, content item, future access, data accessed by user devices, or combination thereof. By way of example, filter criteria blocking data accessed by the user device may be based on metadata knowledge that the content item 111 is a live event (e.g., a sporting event, the teams represented in the event, scores based off sporting events starting at the same time, teams within the same division of play, etc.). In another example, the filter criteria block data based on language in the actual program (e.g. hash tags from twitter feeds shown on the program, key words spoken, etc.). In another example, the filter criteria blocks data based on a content item 111's scheduled show time, blocking text messages from friends that commonly (or previously) had messaged during or just after the scheduled show time.

In one embodiment, the user device module 207 may apply content filters 107 to data accessed or received by a user device 103 corresponding to the user paired with the content item 111 (e.g. the particular user recording the television show). In one embodiment, the user device module 207 may obtain user device information from the customer profiles 115. The customer profiles 115 may include user devices 103 corresponding to the user (e.g. cell phone identifiers, set top box identifiers, pc identifiers, or combinations thereof), filters commonly applied to the user devices 103, filters currently applied to the user devices 103, or combinations thereof. In one embodiment, the user device module 207 may also send notification messages to the originator of data accessed that a content filter has been applied.

In one embodiment, a content access device module 209 may monitor user viewing of content items. In one embodiment, the content access device module 209 authenticates users for interaction with the content filtering platform 101 by comparing against known customer profiles 115. In one embodiment, the content access device module 209 may note partial or full viewing of a content item 111 and remove the corresponding filter 107. The content access device module 209 may use content item module 203 processing to find key parts of the content item 111 and determine when a partial viewing may have shown the user enough of the content item 111 to remove any imposed filters 107. In one embodiment, the content access device module 209 may also track multiple content access devices 105 under the customer profiles 115.

In one embodiment, the user interface module 211 facilitates generation of various interfaces for enabling users to interact with the content filtering platform 101. This includes, for example, generation of a login interface for enabling user registration and/or access to the communication services. By way of example, the user interface module 211 may generate a listing of the content items 111 and content filters 107 applied. It is noted that the user interface module 211 may be activated by way of various APIs or other function calls at a computing device of the third party content provider.

In one embodiment, the communication module 213 executes various protocols and data sharing techniques for enabling collaborative execution between the content filtering platform 101, the user devices 103, the content access devices, the networks 117-123, and other components of the system 100. In addition, the communication module 213 enables generation of signals for communicating with various elements of the service provider network 117, including various gateways, policy configuration functions and the like.

Figure 3:
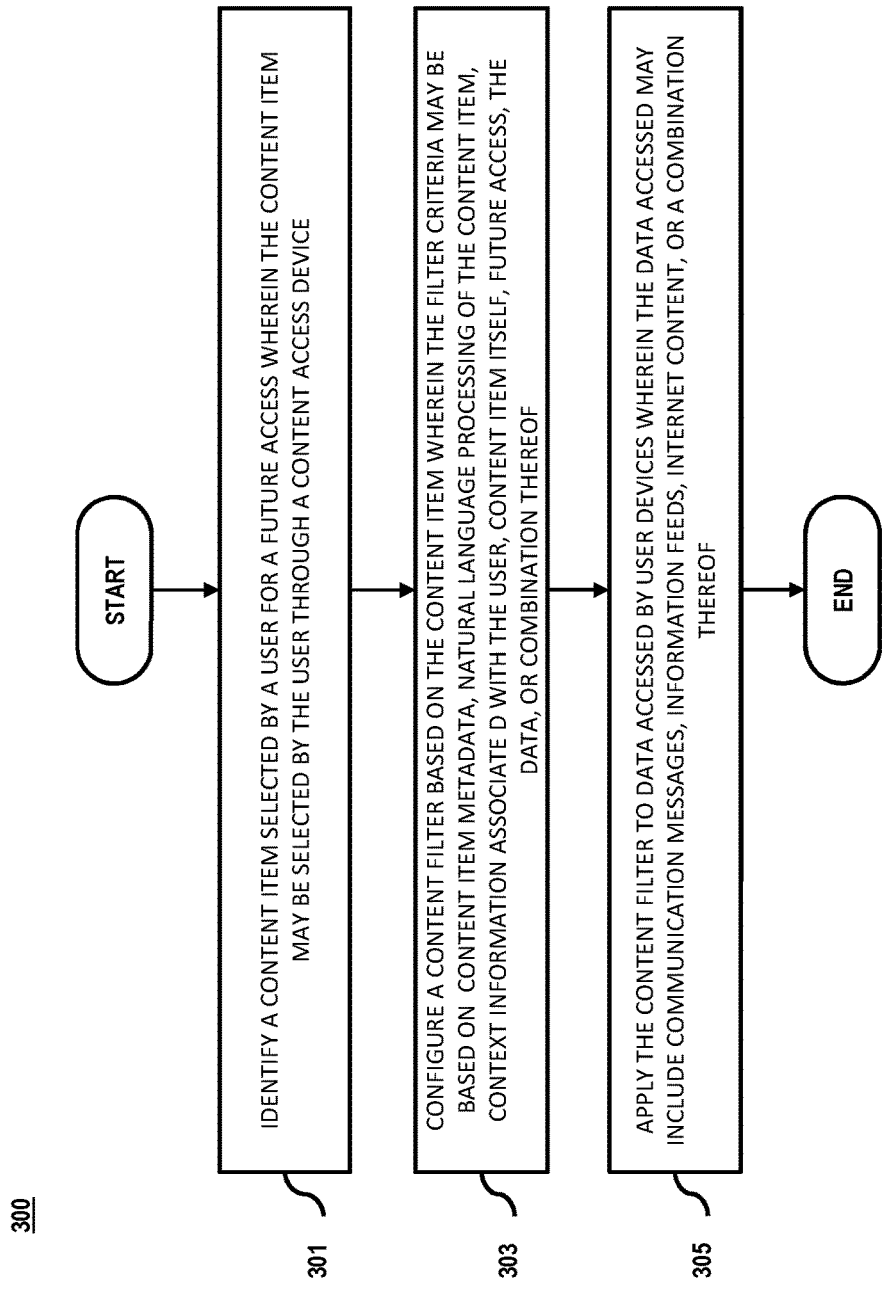
FIG. 3 is a flowchart of a process for filtering data based on content selected for future access, according to one embodiment.
Figure 10:
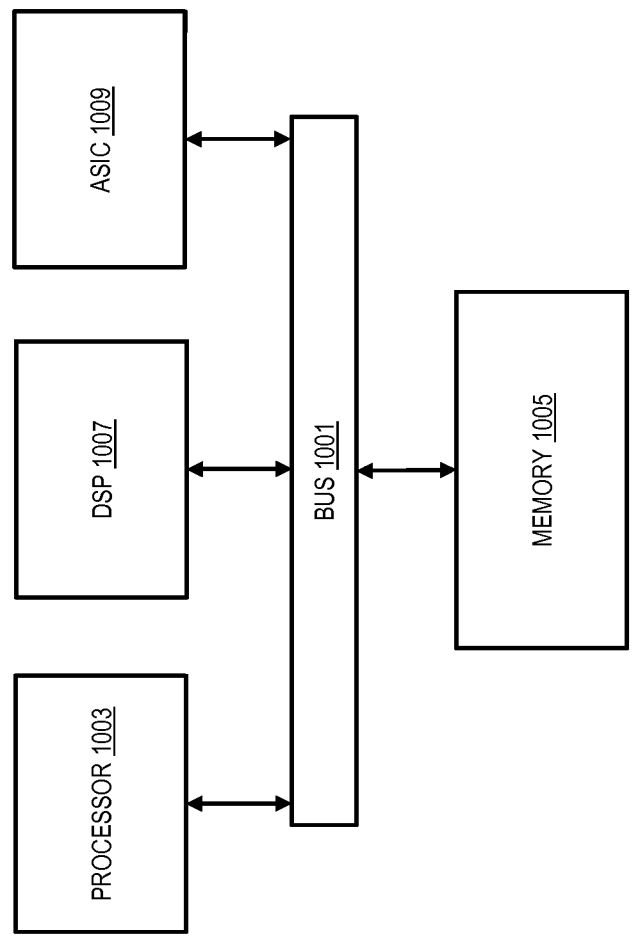
FIG. 10 is a diagram of a chip set that can be used to implement various exemplary embodiments.

FIG. 3 is a flowchart of a process for filtering of user selected content information from data accessed by user devices, according to one embodiment. In one embodiment, the content filtering platform 101 performs the process 300 and is implemented in, for instance, a chip set including a processor and a memory as shown in FIG. 10. In addition or alternatively, the content filtering application 113, the content access devices 105, and/or the user devices 103 may perform all or a portion of the process 300.

In step 301, the content filtering platform 101 may identify a content item 111 selected by a user for a future access wherein the content item 111 may be selected by the user through a content access device 105. The content access device 105 may include, for instance, set top boxes, DVR, personal computer (PC), tablets, or other devices configured to access content items. In one embodiment, the content filtering platform 101 may create, remove, manage and manipulate user selection of content items 111. By way of example, the content item 111 may include movies, music, sporting events, television shows, other media, or a combination thereof. Further, the content filtering platform 101 may manage and monitor future access including how and when the content item 111 is accessed. In one embodiment, the content filtering platform 101 may process and/or facilitate a processing of the selected content item in order to create one or more filters for the selected content item. By way of example, the content access device 105 may be a DVR upon which a user selects a content item, such as a movie to record, rent or stream which may be later accessed on another content access device or the original DVR.

In step 303, the content filtering platform 101 may configure a content filter 107 based on the content item 111, wherein the filter criteria may be based on content item metadata 109, natural language processing of the content item 111, context information associated with the user, the content item 111 itself, future access, the data being filtered, or a combination thereof. By way of example, the user selected content item 111 (e.g., movie, a recorded live event, etc.) contains metadata 109 regarding the content (e.g., for a movie, metadata 109 may include original release date, actors in the movie, etc.). In one embodiment, should the original release date be much further in the past, fewer filters 107 may be applied, because the system 100 may be configured to assume that a user would likely have been exposed to information about the content item 111 over that period of item, and thus there is a lower probability that a user's experience of the content item 111 would be spoiled by incoming data. Under this scenario, the filters 107 that are applied may be more specific, e.g. an actor along with the movie title may be required for the data accessed to be affected by the filter 107. Should the original release date be more current, more filters 107 may be required so all information pertaining to the actor, information pertaining to the movie title, should be filtered. In one embodiment, context information may include a user's commonly associated friends, devices, etc.; the content item's related movies (e.g. a trilogy of movies), similar themed plots, etc.; future access time/location when/where the content item is accessed as related to when the content item was released or when the content item was shown live; and finally the data's originator (e.g. certain people always want to discuss boxing matches or baseball games with the user), semantics (e.g. a "home run" is not the same as "run home"), etc.

In step 305, the content filtering platform 101 may apply the content filter 107 to data accessed by user devices 103 wherein the data accessed may include communication messages, information feeds, internet content, or a combination thereof. In one embodiment, the filter 107 generated can be changed or removed by the user. In one embodiment, multiple filters 107 may be generated based on the content item 111 selected for future access. By way of example, continuing the example in step 305, should the user access a website with the actor's name and/or movie name, the portion of the website addressing the two subjects would be blacked out so the user could not see it. The blacked out sections could also be revealed to the user if the user selects to override the applicable filter 107. By way of example, if the data accessed is communication messages, then a notification may be sent to the originator, a notification may be sent to the user, the messages may be placed in a separate filtered inbox, the message may be deleted, or combination thereof.

Figure 4:
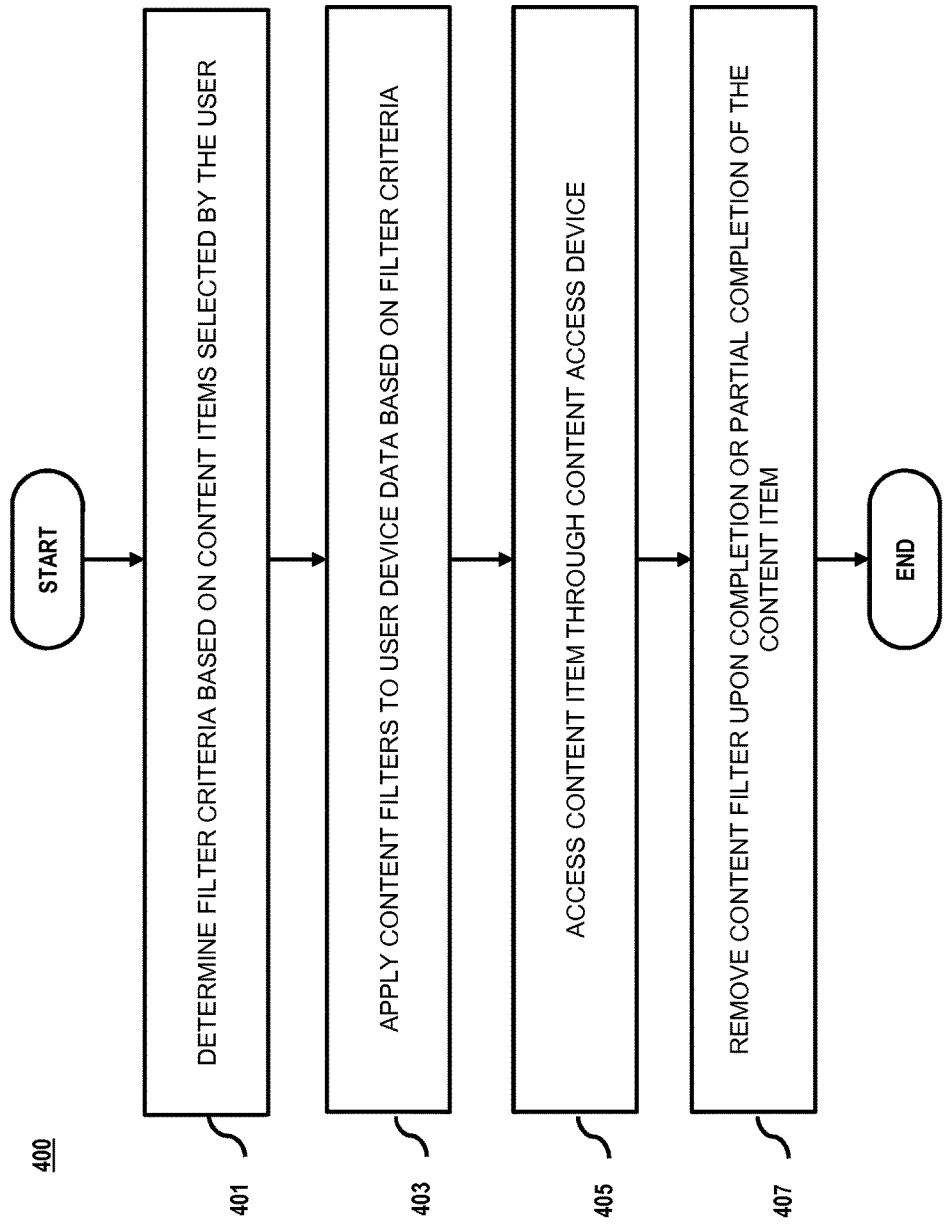
FIG. 4 is a flowchart of a process for filtering of user selected content information from data accessed by user devices driven by user viewing of the content, according to one embodiment.

FIG. 4 is a flowchart of a process for filtering of user selected content information from data accessed by user devices driven by user viewing of the content, according to one embodiment. In one embodiment, the content filtering platform 101 performs the process 400 and is implemented in, for instance, a chip set including a processor and a memory as shown in FIG. 10. In addition or alternatively, the content filtering application 113, the content access devices 105, and/or the user devices 103 may perform all or a portion of the process 400.

In step 401, the content filtering platform 101 determines filter criteria for filters 107 based on content items 111 selected by the user for future access. As previously described, the content items 111 may include but are not limited to movies, music, TV shows, sporting events, etc. In one embodiment, the filter criteria are based on content item 111 and content metadata 109. By way of example, the filter criteria may also account for scheduled show time (e.g. the hour during and after the scheduled showing of the content item) where communications from friends to a user's device may be blocked. The filter criteria may include but are not limited to being based on content item name, names of participants in the content item, related subjects of the content item, related content items, persons that commonly originate data related to the content item, natural language processing of the content item in order to find key related terms, or combination thereof. The user selection of the content item 111 may be by recording, purchasing, renting, streaming, placing on a user's interested viewing list (e.g., a wish list), or combination thereof.

In step 403, the content filtering platform 101 applies content filters 107 to user device data based on filter criteria. In one embodiment, the content filtering platform 101 applies filters 107 to only some of a user's user devices (e.g., user devices 103, content access devices 105) based on previously selected rules, or newly selected rules of filter application. By way of example, the content filtering platform 101 may block data such as voicemails, SMS or text messages to cell phones, black out websites, block information feeds, or block emails. In one embodiment, the content filtering platform 101 may notify senders of communication messages of the application of the content filter 107. In one embodiment, the filter criteria may block communication messages by deleting them, placing them in a separate filtered folder, simply not accept them, or a combination thereof. In one embodiment, the filter criteria may black out or blur website information. The user, in certain embodiments, where the filter criteria may block the communications or website information, may be allowed to access this information prior to viewing of the content item 111.

In step 405, the content filtering platform 101 accesses content items 111 through content access devices 105. In one embodiment, the content filtering platform 101 determines if a user's access of the content item 111 is complete or partial. In one embodiment, the content filtering platform 101 determines if a user's partial access of the content item is enough to be considered a complete viewing. This may be done through processing of the content item 111 or through knowledge that the user has viewed, for example, 51% of the content item.

In step 407, the content filtering platform 101 removes a content filter 107 upon completion or partial completion of the corresponding content item 111. In one embodiment, upon removal, the filtered communication messages may be displayed or user may be allowed access. In one embodiment, the blackout or blurred website information may be stored and released to the user after viewing of the associated content item 111 that was selected for future access.

Figure 5:
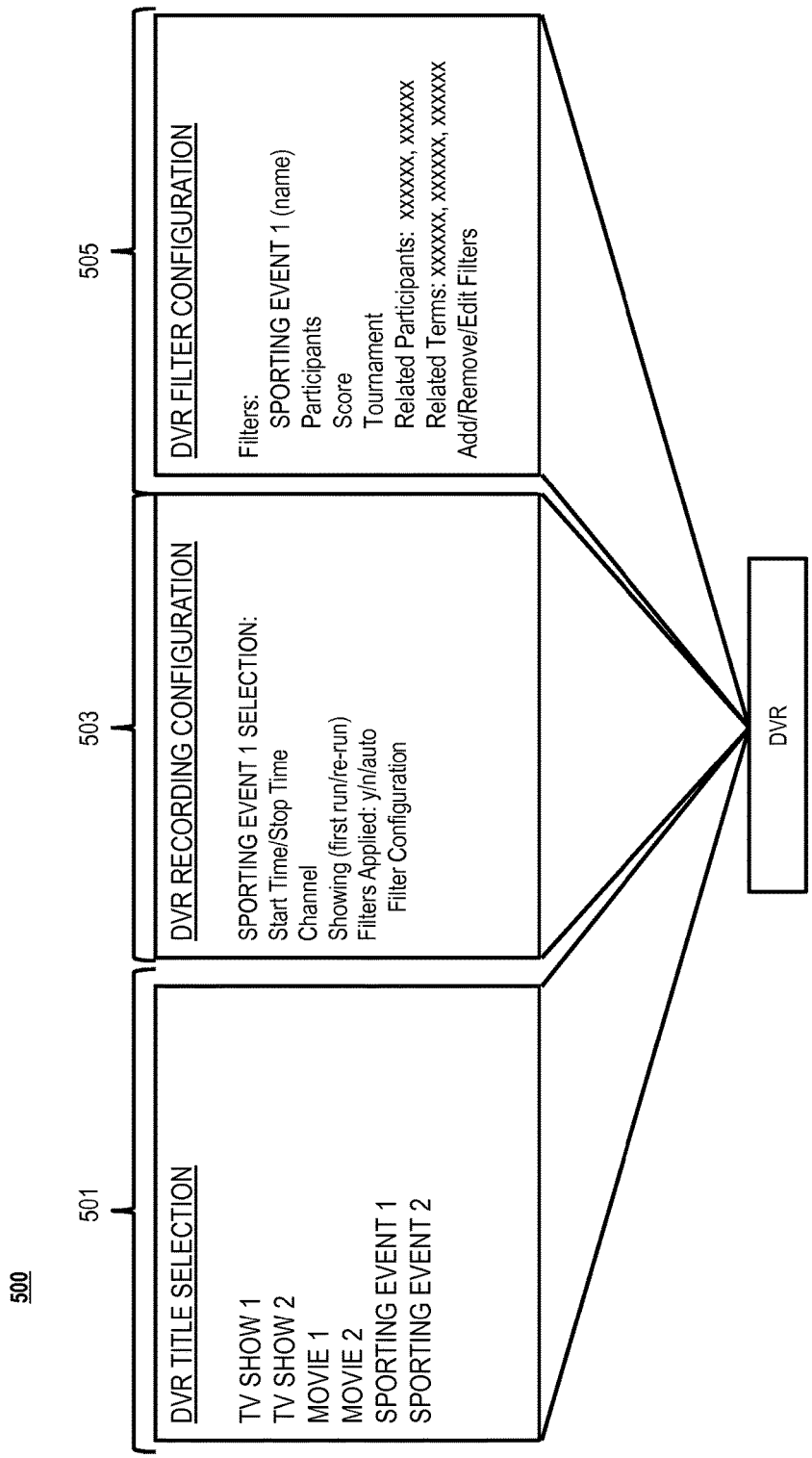
FIG. 5 is a diagram illustrating the filter configuration screen for a content access device, according to one embodiment.

FIG. 5 is a diagram illustrating the filter configuration screen for a content access device, according to one embodiment. In diagram 501, user selects a content item from the selection menu. In diagram 503, upon selection of the content item, further details for setting the recording may be selected, as well as, filter application and configuration settings. In diagram 505, should the user determine they want to add/remove/edit filters, they may enter the filter configuration screen.

Figure 6:
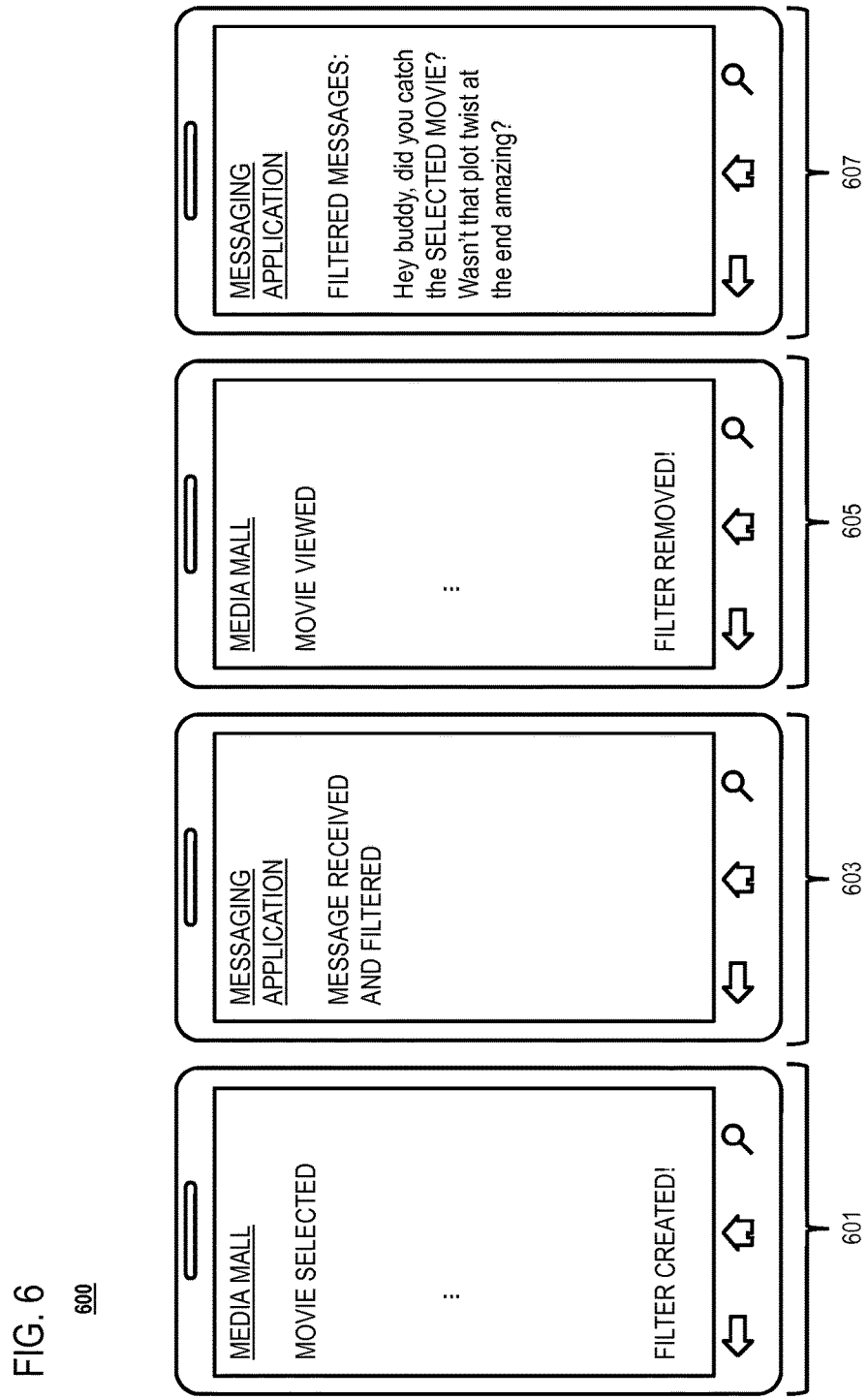
FIG. 6 is a diagram illustrating the filtering of user selected content information from data accessed by a user device, according to one embodiment.

FIG. 6 is a diagram illustrating the filtering of user selected content information from data accessed by a user device, according to one embodiment. In diagram 601, content item is selected which creates the filter, within a media application. In diagram 603, a message from a friend is then received regarding the movie and may or may not be notified to the user that it has been filtered, within a messaging application. In diagram 605, the movie is viewed by the user and filter then removed from the user device, within the media application. In diagram 607, the message may then be released and sent to the messaging application which displays the previously filtered message to the user, within the messaging application. The transitions between each diagram may occur automatically, within a window, or be verified by the user by switching applications.

Figure 7:
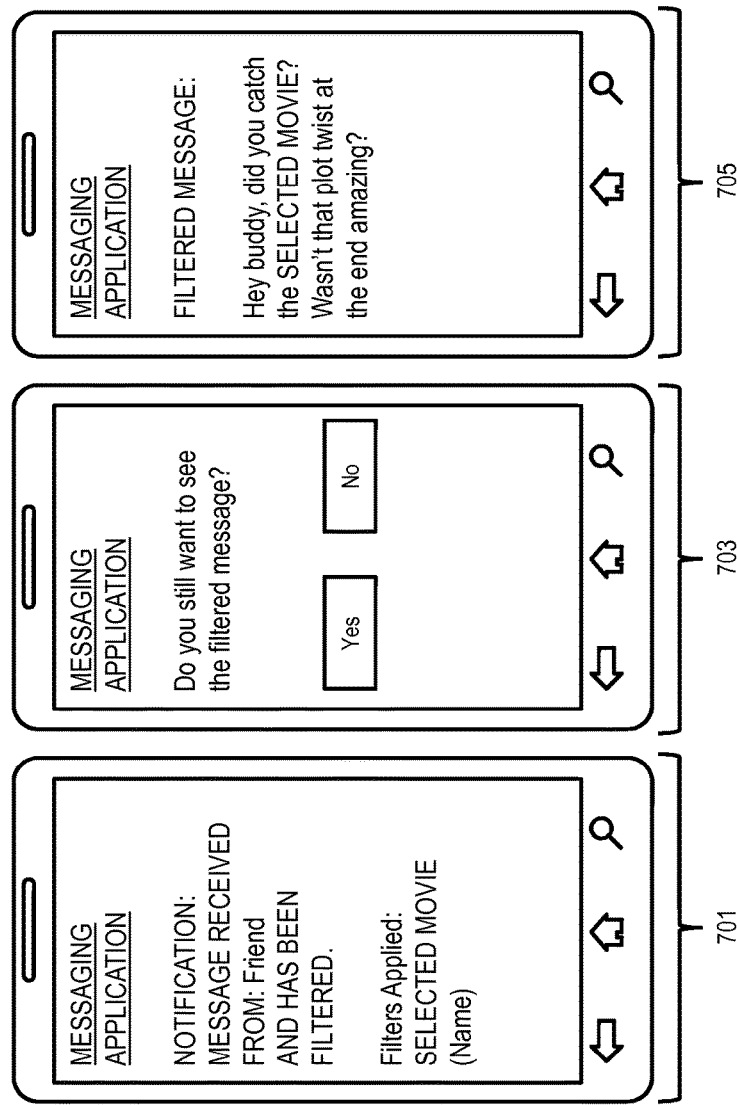
FIG. 7 is a diagram illustrating the filtering of a received message from a user device, according to one embodiment.

FIG. 7 is a diagram illustrating the filtering of a received message from a user device, according to one embodiment. In diagram 701, a notification is displayed of a message received by the user device and filter application. In one embodiment, the filter used may be specified, in other embodiments, the user is not notified of which filter is applied. In diagram 703, the user may be queried about whether they still want to access the filtered message even though it has information related to the selected content item. In diagram 705, upon user selection to continue to view the message or upon removal of a filter, the filtered message may be displayed for the user.

Figure 8:
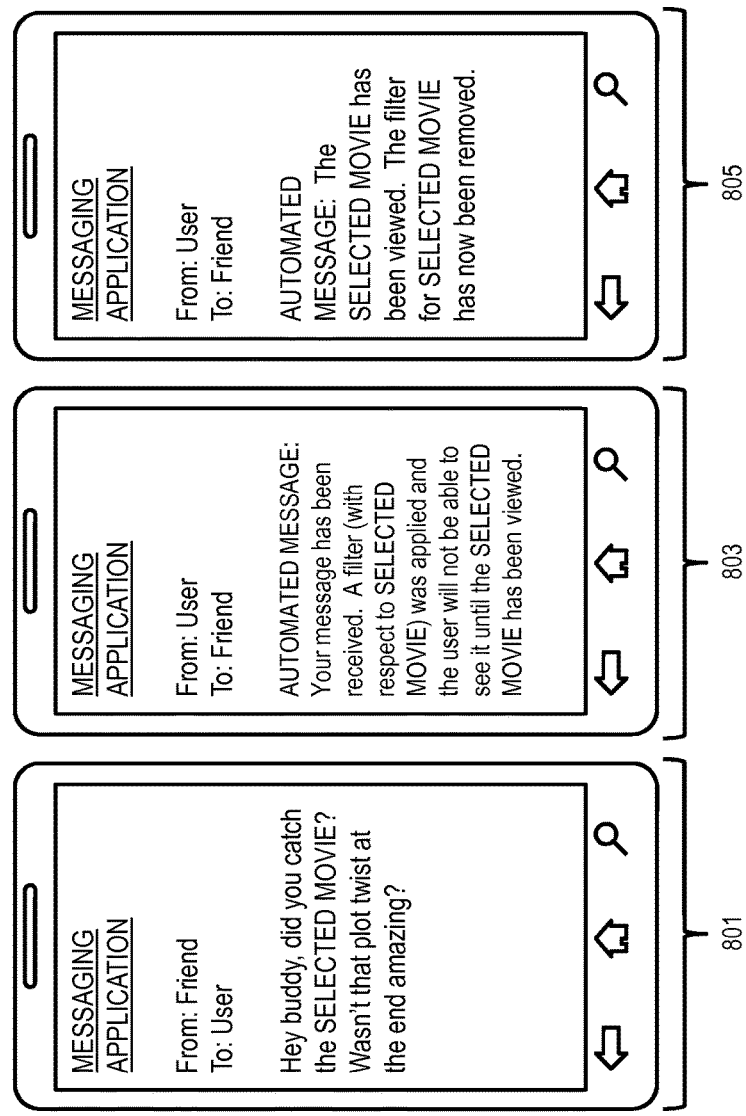
FIG. 8 is a diagram illustrating the notification of a filter application as sent to an originating user device, according to one embodiment.

FIG. 8 is a diagram illustrating the notification of a filter application as sent to an originating user device, according to one embodiment. In diagram 801, a message is sent from an originating user device to the filtered user device. In diagram 803, an automated message is sent notifying the originating user of the application of a filter and possibly which filter was applied. In diagram 805, an automated message may be sent notifying the originating user of the viewing of the content item and removal of the filter in order for the originating user to know that they may now continue to send messages with respect to the filtered content item.

Figure 9:
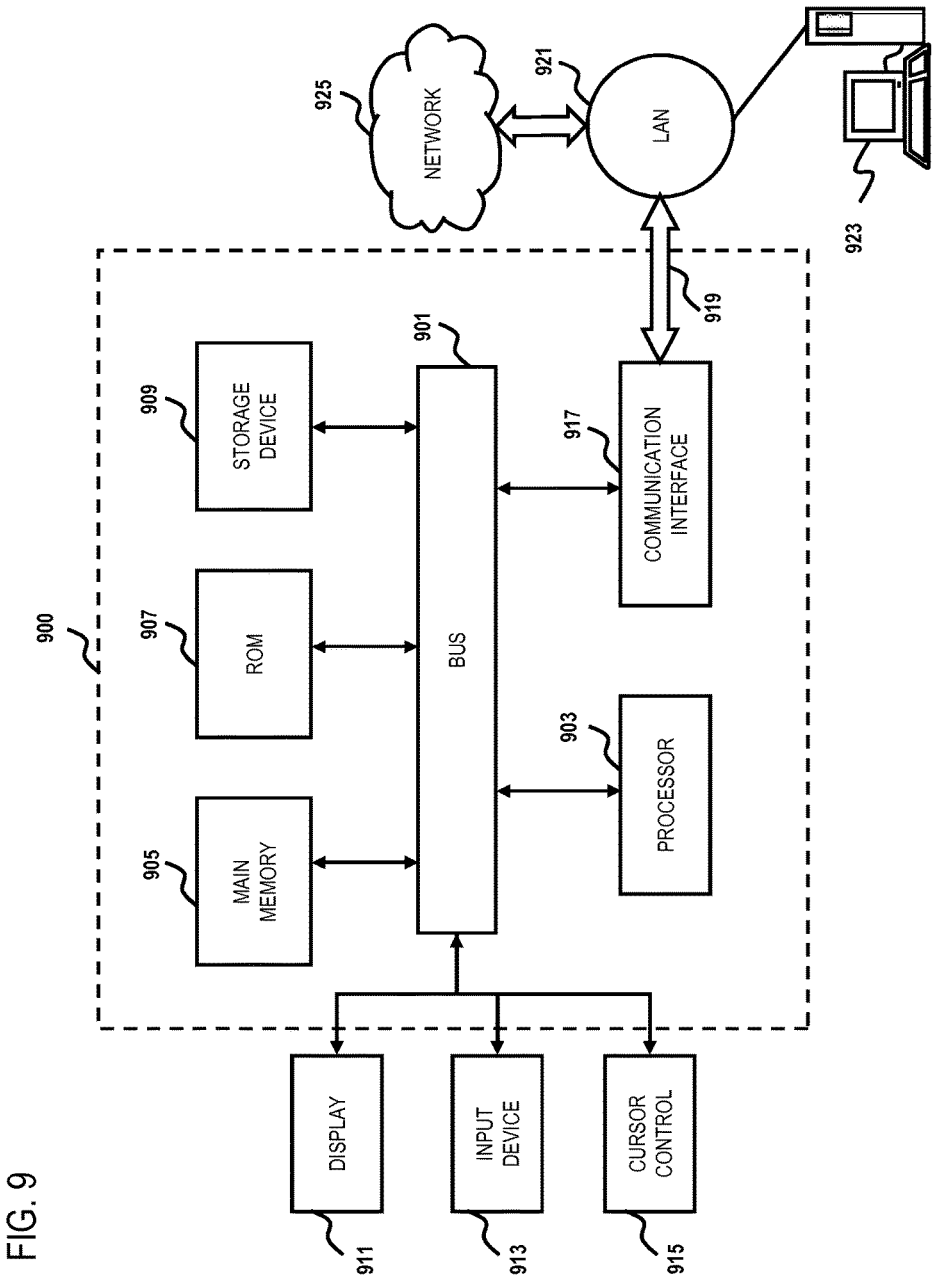
FIG. 9 is a diagram of a computer system that can be used to implement various exemplary embodiments.

FIG. 9 is a diagram of a computer system that can be used to implement various exemplary embodiments. The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multiprocessing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 10 illustrates a chip set 1000 upon which an embodiment of the invention may be implemented. Chip set 1000 is programmed to execute the processes as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of various embodiments described herein.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to perform specialized functions not easily performed by a general purpose processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1005 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving, by an apparatus, a selection of a content item by a user for a future access;
   configuring, by the apparatus, a content filter based on the content item;
   initiating, by the apparatus, an application of the content filter to data received by one or more devices associated with the user via a filtering application installed at the devices, wherein the data includes one or more user-entered texts by one or more other users;
   initiating, by the apparatus, a monitoring of playing of the data at the devices against the content item;
   during the playing of the data at the devices, blacking out or blurring a portion of the one or more user-entered texts while displaying one or more remaining portions of the one or more user-entered texts, when determining that the portion meets the one or more filter criteria for the content item; and
   removing, by the apparatus, the content filter when determining that the content item has been played at one of the devices.

2. A method of claim 1, wherein the content item is received separately from the data at the one of the devices, wherein the apparatus is embedded in a server.

3. A method of claim 1, further comprising:
   determining the content item based on a request to buy the content item, a request to rent the content item, a request to stream the content item, or a combination thereof,
   wherein the content item is played separately from the data at the one of the devices.

4. A method of claim 1, further comprising:
   determining the content item based on a request to record the content item,
   wherein the content item is played via an application different from an application that plays the data at the one of the devices.

5. The method of claim 4, further comprising:
   in response to a user selection to override the content filter at one of the devices, revealing the portion of the one or more user-entered texts at the one of the devices.

6. A method of claim 1, further comprising:
   determining one or more filter criteria for the content filter based on (a) metadata associated with the content item; (b) natural language processing of the content item; (c) context information associated with the user, the content item, the future access, the data, or a combination thereof; or (d) a combination thereof.

7. A method of claim 6, further comprising:
   presenting a user interface indicating a listing of the content item and the content filter on the one of the devices,
   wherein the apparatus is embedded in the one of the devices.

8. A method of claim 1, further comprising:
   sending a notification message to an originator of the data that specifies the portion of the one or more user-entered texts on which the content filter has been applied with respect to the content item and specifies that the user will not be able to see the data until the content filter is removed.

9. A method of claim 8, further comprising:
   sending another notification message to the originator that the content filter has been removed,
   wherein the one or more user-entered texts are included in one or more communication messages, one or more information feeds, Internet content, or a combination thereof, and
   wherein the content item includes one or more movies, music, one or more sporting event programs, one or more television shows, or a combination thereof.

10. An apparatus comprising:
    at least one processor; and
    at least one memory including computer program code for one or more programs,
    the at least one memory and the computer program code configured to, with the at least one processor, cause the apparatus to perform at least the following,
      identify a selection of a content item by a user for a future access;
      configure a content filter based on the content item;
      initiate an application of the content filter to data received by a one or more devices associated with the user via a filtering application installed at the devices, wherein the data includes one or more user-entered texts by one or more other users;
      initiate a monitoring of playing of the data at the devices against the content item;
      during the playing of the data at the devices, black out or blur a portion of the one or more user-entered texts while displaying one or more remaining portions of the one or more user-entered texts, when determining that the portion meets the one or more filter criteria for the content item; and
      remove the content filter when determining that the content item has been played at one of the devices.

11. An apparatus of claim 10, wherein the content item is received separately from the data at the one of the devices.

12. An apparatus of claim 10, wherein the apparatus is further caused to:
    determine the content item based on a request to record the content item, a request to buy the content item, a request to rent the content item, a request to stream the content item, or a combination thereof.

13. An apparatus of claim 10, wherein the content item is played via an application different from an application that plays the data at the one of the devices.

14. An apparatus of claim 10, wherein the apparatus is further caused to:
    determine one or more filter criteria for the content filter based on (a) metadata associated with the content item; (b) natural language processing of the content item; (c) context information associated with the user, the content item, the future access, the data, or a combination thereof; or (d) a combination thereof.

15. An apparatus of claim 14, wherein the apparatus is further caused to:
send a notification message to an originator of the data that the content filter has been applied.

16. An apparatus of claim 15, wherein the data accessed by the devices include one or more communication messages, one or more information feeds, Internet content, or a combination thereof.

17. An apparatus of claim 14, wherein the apparatus is further caused to:
present a user interface indicating a listing of the content item and the content filter.

18. A system comprising a content filtering platform configured to:
identify a selection of a content item by a user for a future access;
configure a content filter based on the content item;
initiate an application of the content filter to data received by one or more devices associated with the user via a filtering application installed at the devices,
wherein the data includes one or more user-entered texts by one or more other users;
initiate a monitoring of playing of the data at the devices against the content item;
during the playing of the data at the devices, black out or blur a portion of the one or more user-entered texts while displaying one or more remaining portions of the one or more user-entered texts, when determining that the portion meets the one or more filter criteria for the content item; and
remove the content filter when determining that the content item has been played at one of the devices.

19. A system of claim 18, wherein the content filtering platform is further configured to:
determine the content item based on a request to record the content item, a request to buy the content item, a request to rent the content item, a request to stream the content item, or a combination thereof.

20. A system of claim 18, wherein the content filtering platform is further configured to:
determine one or more filter criteria for the content filter based on (a) metadata associated with the content item; (b) natural language processing of the content item; (c) context information associated with the user, the content item, the future access, the data, or a combination thereof; or (d) a combination thereof.

21. A system of claim 18, wherein the content filtering platform is further configured to:
send a notification message to an originator of the data that the content filter has been applied.

* * * * *